United States Patent [19]

Boghosian

[11] Patent Number: 4,652,018
[45] Date of Patent: Mar. 24, 1987

[54] MULTI-FASTENING COUPLER FOR ELECTRICAL CONDUIT

[76] Inventor: Paul Boghosian, 937 Dickran Dr., Tulare, Calif. 93274

[21] Appl. No.: 822,124

[22] Filed: Jan. 24, 1986

[51] Int. Cl.$^4$ ............................................. F16L 25/00
[52] U.S. Cl. ..................................... 285/12; 285/161; 285/162; 285/210; 285/921
[58] Field of Search ............... 285/907, 921, 205, 161, 285/12, 319, 162, 210, 206, 207, 208, 209, 322, 323, 324

[56] References Cited

U.S. PATENT DOCUMENTS

| 524,051 | 8/1894 | Walker | 285/210 |
|---|---|---|---|
| 1,669,190 | 5/1928 | Dunmire | 285/207 |
| 2,530,258 | 11/1950 | Marsan | 285/207 X |
| 4,468,535 | 8/1984 | Law | 285/162 X |
| 4,575,133 | 3/1986 | Nattel | 285/921 |

Primary Examiner—Dave W. Arola
Attorney, Agent, or Firm—Dennis B. Haase

[57] ABSTRACT

A coupler for joining electrical conduit to a housing including a nipple adapted to receive the conduit and to fit through an opening in the housing with a shoulder in abutment with one side of the housing and either a nut or tang engaging the other side of the housing.

5 Claims, 6 Drawing Figures

MULTI-FASTENING COUPLER FOR ELECTRICAL CONDUIT

BACKGROUND OF THE INVENTION

The present invention relates to, and has primary utility in, the field of commercial and domestic electrical wiring of structures. It is well-known that in both commercial and residential structures, electrical wiring for such things as outlets and switches, to name but a few, power lines are threaded through conduit into electrical housings or junction boxes which may contain any number of switches, breakers, electrical outlets or the like. The conduit through which the power lines are strung, in many cases is flexible, and may or may not be metallic, and may or may not be electrically conductive, depending upon the particular usage. In all cases, however, some means is required for securing the conduit to the junction box in order to prevent its being pulled away, the consequence of which would be to expose power lines contained in the conduit.

Several coupling devices are available to electricians to secure conduit to a junction box, typically through a knock-out, or aperture in the junction box. Such couplings typically employ some means of gripping the conduit and include an opening to permit the leads contained in the conduit to be threaded through the coupling device into the junction box. The coupler also includes some means for securing it to the junction box, typically in water-tight relation, and the more common method used for this purpose is to provide a threaded nipple on the connector which is intended to pass through the knock-out in the junction box and receive a lock nut or the like to secure it to the wall thereof. More sophisticated couplings, such as that depicted in Law Pat. No. 4,468,535, are highly specialized in that they are intended for use under circumstances in which the conduit itself becomes an electrical ground and electrical continuity is required between the junction box and the conduit.

Electrical contractors are finding it increasingly difficult to deal with high labor costs, which is a dominant factor in contracting for and performing electrical wiring services. Thus, there is a market for any device which results in labor-savings, no matter how seemingly insignificant they might be on a single-use basis. The principle objective of the present invention is to provide a multi-faceted coupler capable, not only of saving time and its use, but further providing, in a single unit, a multi-purpose device capable of two distinct fastening modes, thereby providing, in a single unit, the function of at least two separate coupling devices which the contractor might otherwise have to inventory. Another objective, of course, is to provide a single coupler which is capable of meeting several needs, thereby minimizing the amount of inventory a contractor may be required to carry.

THE DRAWINGS

With the foregoing provided by way of introduction, a preferred embodiment of the present invention will be hereinafter described in conjunction with the accompanying sheet of drawings wherein:

FIGS. 3a and 4a, respectively, illustrate the embodiments of FIGS. 3 and 4 in their secured position held to the junction box by a stop nut or the like.

DESCRIPTION OF PREFERRED EMBODIMENT

Figure 1:
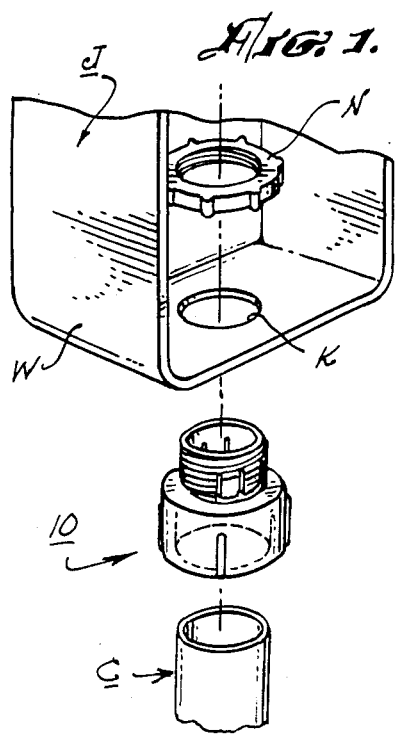
FIG. 1 is a pictorial view, partially exploded, illustrating a coupler constructed in accordance with the present invention in its anticipated environment.

With reference now to the drawings, and more particularly to FIG. 1, a coupler 10 is illustrated in an exploded view, together with the end of an electrical conduit and a junction box J, having a knock-out or opening K in the bottom thereof, as illustrated.

Figure 2:
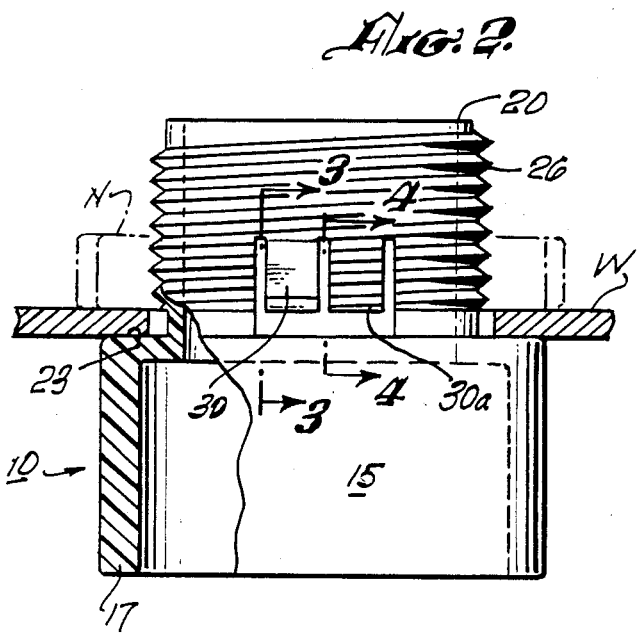
FIG. 2 is a partial sectional view of the preferred embodiment of the coupler of the present invention shown in its typical secure position to the wall of a junction box.

The several novel features of the coupler 10 are illustrated primarily in FIG. 2. As there shown, the coupler comprises a tubular member which, in order to be cost effective, is designed to be formed as a unitary structure which may be extruded, typically of a plastic material. A conduit receiving section 15 includes a cylindrical side wall 17 defining a conduit receiving receptacle into which conduit C may be pressed and secured.

Extending longitudinally from, and formed coaxially with, the conduit receiving segment is a male coupling segment, or nipple, 20 which, not unlike the conduit receiving segment 15, is cylindrical in configuration. The diameter of the male nipple is less than that of the conduit receiving segment by an amount sufficient to define a shoulder 23 between them.

As may be seen in FIG. 2, when the coupler is inserted through the knock-out K, its travel is limited by the shoulder 23 which abuts against and rests upon the wall W of the junction box J.

In most conventional coupling devices, the cylindrical wall of the nipple 20 is formed with threads 26 about its outer circumference and a nut N fits over the nipple end 20, engaging the threads to secure the coupler to the junction housing by pinching the wall W of the junction box between the nut N and the shoulder 23 of the coupler.

In order to accomplish the two-fold objectives of the present invention, i.e., the elimination of the necessity of maintaining an inventory of different types of couplers, and providing the user with cost savings through labor savings, the coupler of the present invention is provided with a second means of securing the coupling to the wall of the junction box. The "snap-on" alternative is accomplished, in accordance with the present invention, by the provision of one or more sets of protuberances or tangs 30. Each set of tangs 30 are preferrably formed in the cylindrical wall of the nipple, and a set comprises a pair of said protuberances diametrically opposed 180° apart.

Figure 3:
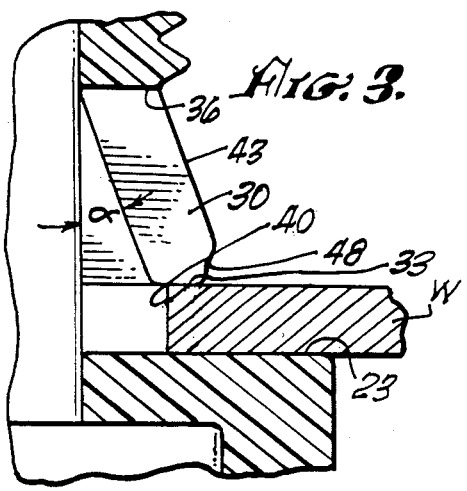
FIG. 3 and FIG. 4 are partial sectional elevations illustrating two embodiments of the present invention, illustrating their snap-lock function.
Figure 4:
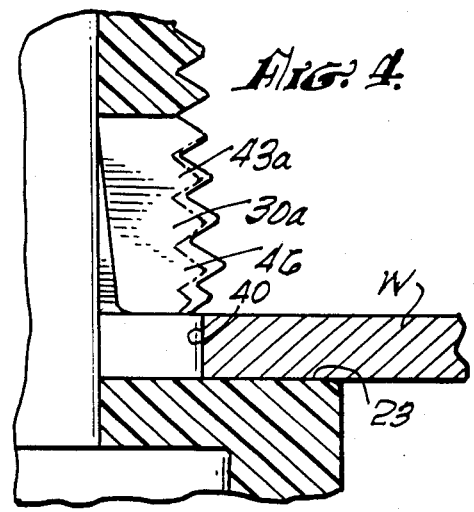
Figure 3A:
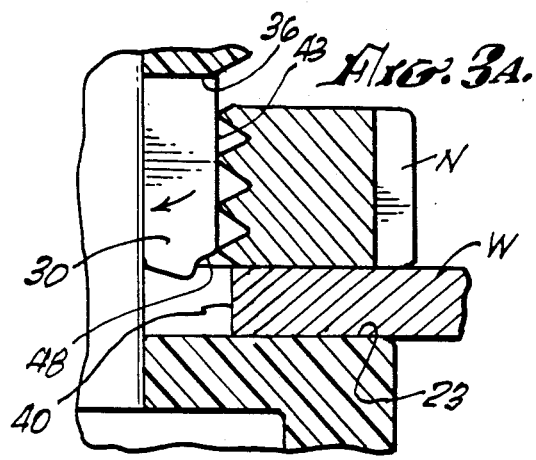

With reference particularly to FIGS. 3 and 4, each such tang, or protuberant member extends radially outwardly to form an angle α such that the free end 33 of each pair of protuberant members has a diametral distance between them which is greater than the diameter of the knock-out or the junction box into which the coupling is to be fitted. Each protuberant member 30 is flexible at its root 36 to permit the protuberant member to be flexed inwardly as the nipple segment 20 passes through the knock-out K in the wall W of the junction box J. The circumferential surface 40 of the wall W which forms the knock-out aperture presses against the outer wall 43, which acts as a cam to urge the protuberant member 30 inwardly as the nipple passes through the knock-out K. The space between the shoulder 23 and the terminus 33 of the protuberant member 30 in its relaxed, distended position is slightly greater than the thickness of the wall W so that when the shoulder 23 comes to rest on the wall W the terminus 33 has passed through the knock-out K and is no longer under the influence of the circumferential wall 40. The result is that the protuberant member springs outwardly to its normally distended position thereby locking the coupler into the junction housing by pinching the wall W between the shoulder 23 and the terminus 33 of the protuberant member 30.

In use, couplers constructed in accordance with the present invention, permit the user to carry a single form of coupler which is capable of performing several tasks. For example, where a simple locking engagement is all that is required, and the weight of the conduit, or tension on the conduit, is not a concern, the user may first insert the conduit C into the coupler 10 and by applying pressure on the coupler in the direction of the junction box, may force the coupler through the knock-out in such a manner as to first depress the protuberant members as the nipple segment 20 passes through the knockout. Once in place, of course, the protuberant members will snap out or distend to a position which will result in the pinching of the wall of the junction box between the terminal edge 33 of the protuberant members and the shoulder 23 of the coupling. The locking action is accomplished by a single pushing movement and results in a safe, secure attachment in an absolute minimum of elapsed time.

Under circumstances where the conduit depends vertically from the junction box as is illustrated in FIG. 1, or in circumstances where a more permanent or more water-tight seal between the coupler and the junction box is desirable or necessary, the same novel coupler 10 may be used. Under such circumstances, the same attaching movement is employed as previously discussed. Additionally, however, because of the threads 26, additional sealing pressure may be applied on the coupler by use of a nut N resulting in a more efficient and secure seal between the junction box and the coupler.

FIGS. 3 and 4 illustrate two forms of the protuberant member, either one of which will bring about a comparable novel result.

Figure 4A:
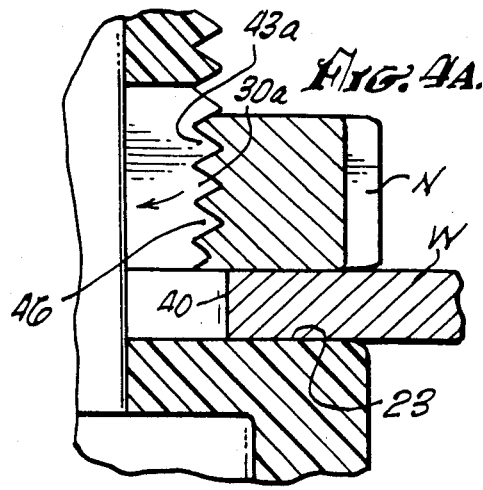

In the FIG. 3 form, the protuberant member is formed with a relatively smooth side wall 43 which results in a relatively smoother camming of the protuberant member as the nipple N segment proceeds through the knock-out K. FIG. 4, of course, illustrates the same protuberant member 30a, with the single difference being that the surface 43a is threaded as at 46. In both cases, the free end 33 may be notched as at 48 to facilitate removal of the coupling if desired. Whereas the configuration of FIGS. 4 and 4a may result in a slightly rougher or more difficult passage of the nipple segment 20 through the knock-out K and against the wall 40, under such cirsumstances where a nut N is also to be applied to the nipple segment, the threads on the protuberant member will engage threads of the nut N bringing about a more efficient seal where such may be required.

Having now described the invention in its various aspects, what is claimed is:

1. A coupler for joining electrical conduit to a housing defined by a wall having a knockout therein:
    said coupling being formed as a unitary member, said member comprising a conduit receiving segment having means defining a cylindrical conduit receiving receptacle; and,
    a male coupling segment, said coupling segment comprising a cylindrical wall projecting coaxially from said conduit receiving segment, means defining a shoulder separating said segments, said cylindrical wall having threads formed on the outside diameter thereof, said cylindrical wall having diametrically opposed protuberance disposed thereon, said protuberances extending radially outwardly of the circumference of said cylindrical wall in their normal at rest position, said protuberances adapted to be resiliently compressed as said coupler is urged through the knockout in the housing, and thereafter returning to their protuberant position to secure said coupler to the wall against such shoulder.

2. The coupler as set forth in claim 1 wherein said protuberances comprise two pairs of protuberances.

3. The coupler as set forth in claim 2 wherein the surface of each said protuberance is threaded, said threads being aligned with the threads on the said male coupling segment.

4. The coupler as set forth in claim 3 wherein each said protuberance is formed with a notch at the free end thereof.

5. The coupler as set forth in claim 1 wherein:
    each protuberance having a surface at its terminus being transverse to the axis of said coupler so as to engage the wall of said housing in face to face relation.

* * * * *